United States Patent
Wu et al.

(10) Patent No.: US 9,866,826 B2
(45) Date of Patent: Jan. 9, 2018

(54) CONTENT-ADAPTIVE MULTI-FOCAL DISPLAY

(71) Applicants: Wanmin Wu, Foster City, CA (US);
Patrick Llull, Durham, NC (US);
Ivana Tosic, Berkeley, CA (US);
Kathrin Berkner, Los Altos, CA (US);
Noah Bedard, San Francisco, CA (US)

(72) Inventors: Wanmin Wu, Foster City, CA (US);
Patrick Llull, Durham, NC (US);
Ivana Tosic, Berkeley, CA (US);
Kathrin Berkner, Los Altos, CA (US);
Noah Bedard, San Francisco, CA (US)

(73) Assignee: Ricoh Company, Ltd., Tokyo (JP)

( * ) Notice: Subject to any disclaimer, the term of this patent is extended or adjusted under 35 U.S.C. 154(b) by 12 days.

(21) Appl. No.: 14/642,095

(22) Filed: Mar. 9, 2015

(65) Prior Publication Data
US 2016/0148416 A1     May 26, 2016

Related U.S. Application Data

(60) Provisional application No. 62/084,264, filed on Nov. 25, 2014.

(51) Int. Cl.
*G06T 15/08* (2011.01)
*G06T 15/10* (2011.01)
*H04N 13/04* (2006.01)

(52) U.S. Cl.
CPC ....... *H04N 13/0495* (2013.01); *H04N 13/042* (2013.01)

(58) Field of Classification Search
None
See application file for complete search history.

(56) References Cited

U.S. PATENT DOCUMENTS

| | | |
|---|---|---|
| 5,193,124 A | 3/1993 | Subbarao |
| 5,227,890 A | 7/1993 | Dowski, Jr. |
| 5,521,695 A | 5/1996 | Dowski |
| 5,550,935 A | 8/1996 | Erdem et al. |
| 5,748,371 A | 5/1998 | Cathey, Jr. et al. |
| 5,793,900 A | 8/1998 | Nourbaksh et al. |
| 5,870,179 A | 2/1999 | Cathey, Jr. et al. |
| 5,932,872 A | 8/1999 | Price |
| 5,956,436 A | 9/1999 | Chien |

(Continued)

FOREIGN PATENT DOCUMENTS

| | | |
|---|---|---|
| EP | 0814605 | 12/1997 |
| EP | 0998124 | 5/2000 |

(Continued)

OTHER PUBLICATIONS

Hu et al. "Design and Assessment of a Depth-Fused Multi-Focal-Plane Display Prototype", Journal of Display Technology, vol. 10, No. 4, Apr. 2014.*

(Continued)

*Primary Examiner* — Yingchun He
(74) *Attorney, Agent, or Firm* — Fenwick & West LLP

(57) ABSTRACT

A multi-focal display represents a 3-dimensional scene by a series of 2-dimensional images located at different focal planes. The locations of the focal planes are selected based on an analysis of the three-dimensional scene to be rendered by the multi-focal display.

20 Claims, 6 Drawing Sheets

(56) References Cited

U.S. PATENT DOCUMENTS

| | | |
|---|---|---|
| 6,021,005 A | 2/2000 | Cathey, Jr. et al. |
| 6,069,738 A | 5/2000 | Cathey, Jr. et al. |
| 6,519,359 B1 | 2/2003 | Nafis et al. |
| 6,525,302 B2 | 2/2003 | Dowski, Jr. et al. |
| 6,842,297 B2 | 1/2005 | Dowski, Jr. |
| 6,873,733 B2 | 3/2005 | Dowski, Jr. |
| 6,911,638 B2 | 6/2005 | Dowski, Jr. et al. |
| 6,940,649 B2 | 9/2005 | Dowski, Jr. |
| 7,027,221 B2 | 4/2006 | Hamborg |
| 7,158,182 B2 | 1/2007 | Watanabe et al. |
| 7,612,804 B1 | 11/2009 | Marcu et al. |
| 8,411,931 B2 | 4/2013 | Zhou et al. |
| 8,897,595 B2 | 11/2014 | Robinson |
| 2002/0118457 A1 | 8/2002 | Dowski, Jr. |
| 2002/0163482 A1 | 11/2002 | Sullivan |
| 2002/0195548 A1 | 12/2002 | Dowski, Jr. et al. |
| 2003/0057353 A1 | 3/2003 | Dowski, Jr. et al. |
| 2003/0169944 A1 | 9/2003 | Dowski, Jr. et al. |
| 2003/0173502 A1 | 9/2003 | Dowski, Jr. et al. |
| 2004/0145808 A1 | 7/2004 | Cathey, Jr. et al. |
| 2004/0190762 A1 | 9/2004 | Dowski, Jr. et al. |
| 2004/0228005 A1 | 11/2004 | Dowski, Jr. |
| 2004/0257543 A1 | 12/2004 | Dowski, Jr. et al. |
| 2005/0088745 A1 | 4/2005 | Cathey, Jr. et al. |
| 2005/0117114 A1 | 6/2005 | Jiang |
| 2005/0129327 A1 | 6/2005 | Hillis et al. |
| 2005/0197809 A1 | 9/2005 | Dowski, Jr. |
| 2005/0264886 A1 | 12/2005 | Dowski, Jr. |
| 2009/0284489 A1 | 11/2009 | Batchko |
| 2011/0075257 A1 | 3/2011 | Hua et al. |
| 2012/0075696 A1 | 3/2012 | Jung et al. |
| 2015/0178980 A1 | 6/2015 | Bublitz et al. |
| 2015/0205126 A1* | 7/2015 | Schowengerdt .......... G06T 7/73 345/633 |
| 2015/0277129 A1 | 10/2015 | Hua et al. |
| 2015/0346495 A1 | 12/2015 | Welch et al. |

FOREIGN PATENT DOCUMENTS

| | | |
|---|---|---|
| JP | H 11-196315 | 7/1999 |
| JP | 2006-333229 | 12/2006 |
| WO | WO 2004/063989 | 7/2004 |
| WO | WO 2005/040909 A1 | 5/2005 |
| WO | WO 2014/062912 A1 | 4/2014 |

OTHER PUBLICATIONS

Liu et al. "A systematic method for designing depth-fused multi-focal plane three-dimensional displays", Optics Express, vol. 18, No. 11, May 2010.*

Rooms, F et al, PSF Estimation with applications in autofocus and image restoration, IEEE 2002.

Bascle et al, "Motion Deblurring and Super-resolution from an Image Sequence" ECCV'96.

Cathey, W. Thomas et al., "New paradigm for imaging systems," Applied Optics, vol. 41, No. 29, Oct. 10, 2002, pp. 6080-6092.

European Search Report, EP06253130, dated Sep. 26, 2005, 7 pages.

Fales, C.L. et al., "Imaging System Design for Improved Information Capacity," Applied Optics, Mar. 15, 1984, pp. 872-888, vol. 23, No. 6.

Maeda, Peter Y. et al., "Integrating lens design with digital camera simulation," 5678 SPIE Proceedings SPIE Electronic Imaging, San Jose, CA, Feb. 2005, pp. 48-58.

Japanese Office Action, Japanese Application No. 2009-075210, dated Apr. 16, 2013, 6 pages (with concise explanation of relevance).

United States Office Action, U.S. Appl. No. 12/079,555, dated Jan. 31, 2014, 7 pages.

United States Office Action, U.S. Appl. No. 12/079,555, dated Feb. 29, 2012, 16 pages.

United States Office Action, U.S. Appl. No. 12/079,555, dated May 11, 2011, 14 pages.

United States Office Action, U.S. Appl. No. 14/551,998, dated Oct. 29, 2015, 11 pages.

Hu, X. et al., "Design and Assessment of a Depth-Fused Multi-Focal-Plane Display Prototype," Journal of Display Technology, 2014, pp. 308-316, vol. 10, No. 4.

Hu, X., "Distinguished Student Paper: A Depth-Fused Multi-Focal-Plane Display Prototype Enabling Focus Cues in Stereoscopic Displays," in SID Symposium Digest of Technical Papers, Wiley Online Library, 2011, pp. 691-694, vol. 42.

Liu, S. et al., "Time-Multiplexed Dual-Focal Plane Head-Mounted Display with a Liquid Lens," Optics Letters, 2009, pp. 1642-1644, vol. 34, No. 11.

Liu, S. et al., "An Optical See-Through Head Mounted Display with Addressable Focal Planes," IEEE ACM, 2008, pp. 33-42.

Liu, S. et al., "A Systematic Method for Designing Depth-Fused Multi-Focal Plane Three-Dimensional Displays," Optics Express, 2010, pp. 11562-11573, vol. 18, No. 11.

Love, G.D. et al., "High-Speed Switchable Lens Enables the Development of a Volumetric Stereoscopic Display," Optics Express, 2009, pp. 15716-15725, vol. 17, No. 18.

Mackenzie, K. J. et al., "Accommodation to Multiple-Focal-Plane Displays: Implications for Improving Stereoscopic Displays and for Accommodation Control," Journal of Vision, 2010.

Ravikumar, S. et al., "Creating Effective Focus Cues in Multi-Plane 3d Displays," Optics Express, 2011, pp. 20940-20952, vol. 19, No. 21.

Shibata et al., "The Zone of Comfort: Predicting Visual Discomfort with Stereo Displays," Journal of Vision, 2011, pp. 1-29, vol. 11, No. 8.

United States Office Action, U.S. Appl. No. 15/061,938, dated May 10, 2017, 9 pages.

* cited by examiner

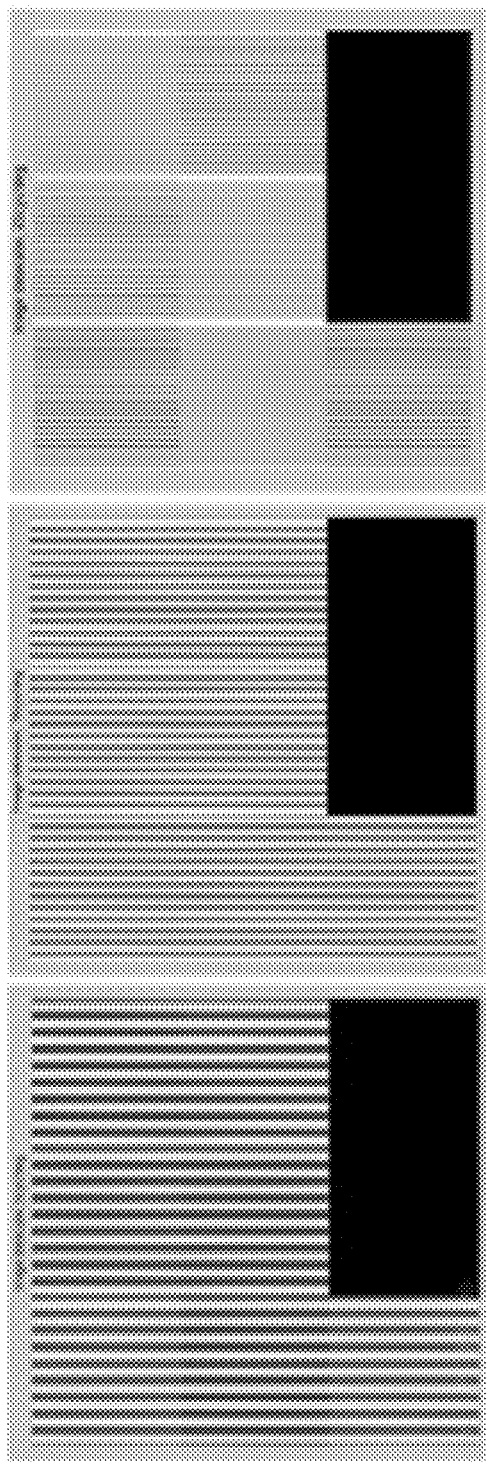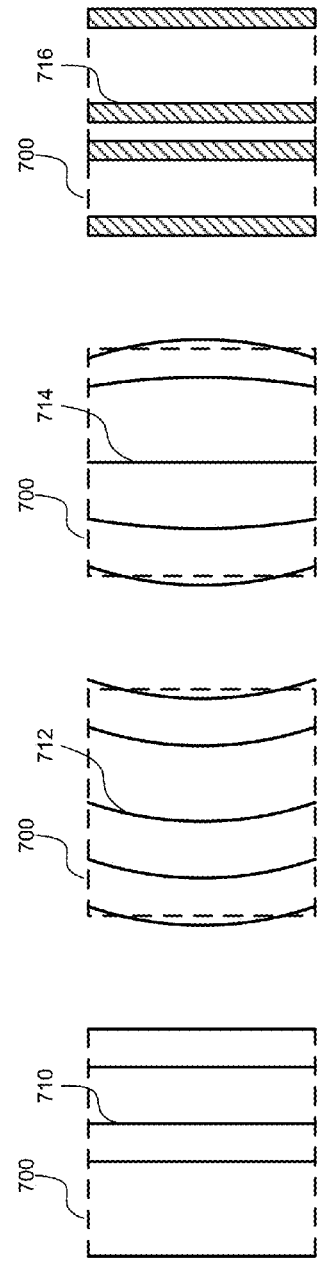

CONTENT-ADAPTIVE MULTI-FOCAL DISPLAY

CROSS-REFERENCE TO RELATED APPLICATION(S)

This application claims priority under 35 U.S.C. §119(e) to U.S. Provisional Patent Application Ser. No. 62/084,264, "Content-Adaptive Multi-Focal Display," filed Nov. 25, 2014. The subject matter of all of the foregoing is incorporated herein by reference in its entirety.

BACKGROUND

1. Field of the Invention

This disclosure relates generally to multi-focal displays.

2. Description of Related Art

Multi-focal displays (MFDs) typically use rapid temporal and focal modulation of a series of 2-dimensional images to render 3-dimensional (3D) scenes that occupy a certain 3D volume. This series of images is typically focused at parallel planes positioned at different, discrete distances from the viewer. The number of focal planes directly affects the viewers' eye accommodation and 3D perception quality of a displayed scene. If a given 3D scene is continuous in depth, too few planes may make the MFD rendering look piecewise with discontinuities between planes or result in contrast loss. More planes is typically better in terms of perceptual quality, but can be more expensive to implement and often may not be achievable because of practical display limitations including bandwidth and focal modulation speed.

Therefore, an important consideration for MFDs is the focal plane configuration, including the number of focal planes and the location of the focal planes (that is, distances from the viewer). Multi-focal displays typically use focal plane configurations where the number and location of focal planes are fixed. Often, the focal planes are uniformly spaced. This one size fits all approach does not take into account differences in the scenes to be displayed and the result can be a loss of spatial resolution and perceptual accuracy.

Thus, there is a need for better approaches to determining focal plane configuration.

SUMMARY

The present disclosure overcomes the limitations of the prior art by selecting the locations of the focal planes for a multi-focal display, based on an analysis of the scene to be rendered by the multi-focal display. In one example, a distortion metric is defined that measures a distortion between an ideal rendering of a three-dimensional scene versus the rendering by a limited number of focal planes in the multi-focal display. The locations of the focal planes are selected by optimizing the distortion metric. One distortion metric is based on differences between the location of a point in the ideal rendering versus the location of the closest focal planes of the multi-focal display. Another distortion metric is based on differences in the defocus blurring for the ideal rendering versus the rendering by the multi-focal display.

Other aspects include components, devices, systems, improvements, methods, processes, applications, computer readable mediums, and other technologies related to any of the above.

BRIEF DESCRIPTION OF THE DRAWINGS

Embodiments of the disclosure have other advantages and features which will be more readily apparent from the following detailed description and the appended claims, when taken in conjunction with the accompanying drawings, in which:

FIGS. 6a-6c show simulated eye responses for stimulus with different spatial frequencies rendered between planes using depth blending.

FIGS. 7a-d are diagrams showing different types of multi-focal displays.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION OF THE PREFERRED EMBODIMENTS

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Introduction

Figure 1:
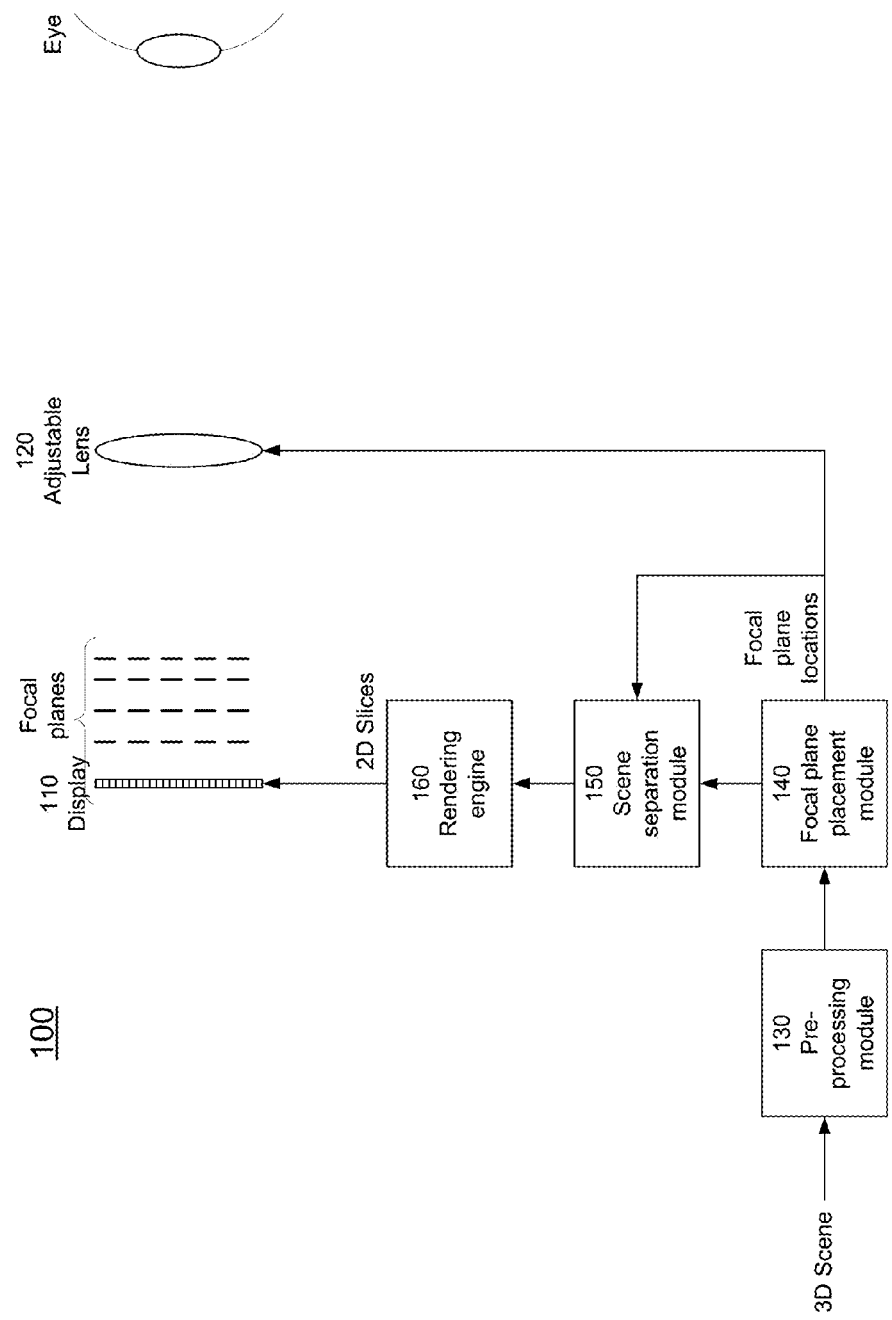
FIG. 1 is a diagram of a multi-focal display according to the present invention.

FIG. 1 is a diagram of a multi-focal display 100 according to the present invention. The MFD 100 includes a display 110, an adjustable optical element 120 and modules 130-160 for scene rendering and focal plane control. Examples of optical element 120 include deformable lenses, lenses with adjustable index of refraction, and deformable mirrors. Modules 130-160 could be implemented in hardware, software or a combination of the two. The optical element 120 is adjustable. At different adjustments, the display 110 appears at different locations (focal planes), which are represented by the dashed lines in FIG. 1. In this way, a 3D scene can be approximated by a series of 2D images rendered at the different focal planes.

Optional pre-processing module 130 receives data representing the 3D scene to be rendered and adapts it to rendering requirements. For example, pre-processing module 130 may perform functions such as magnifying, cropping and sharpening. Focal plane placement module 140 analyzes the content of the 3D scene and selects the locations of the focal planes based on the content analysis. The selection can also be based on rendering requirements. Scene separation module 150 separates the 3D scene into the constituent 2D images to be rendered. This typically involves depth blending, as will be described below. The content of each 2D image will depend on the focal plane locations. Rendering engine 160 then renders the 2D images onto the display, in coordination with adjustment of the optical element 120 to effect the different focal planes.

Additional post-processing can also be performed. For example, smoothing constraints (temporal and/or spatial) may be applied, or occlusion edges may be processed to further improve perceived quality.

In FIG. 1, the MFD dynamically adjusts the focal plane settings based on the content of the scene and/or rendering requirements, for example to minimize contrast loss attributed to depth blending and/or to maximize the perceptual quality of the rendered 3D scene. The focal planes need not be uniformly spaced. Nor are they required to be statically located. The locations can be dynamically adjusted depending on the scene content and/or rendering requirements. For example, the latest DMD (digital micromirror device) chips used in multi-focal displays can achieve a flicker-free display by multiplexing about 6 focal planes at 60 Hz per plane. In this case, a viewer can view the displayed 3D scene and correctly accommodate to scene content at those six planes. This number of focal planes is typically sufficient for single-user, near-the-eye multi-focal displays. This speed is sufficient to render video in real-time. GPUs may be used to speed up calculation. The focal plane configuration may be adjusted for each frame of video or less frequently, for example every certain number of frames or for each scene.

Depth Blending

MFD technology can represent a 3D scene by a series of 2D images at different focal planes due to a concept known as depth blending. By illuminating two adjacent focal planes simultaneously, a focus cue may be rendered at any axial distance between the planes. Since the two focal planes lie along a line of sight, the luminance provided by each of the adjacent focal planes determines where the cue will be highest (where the eye perceives the highest visual quality, or where the area under the modulation transfer function (MTF) observed by the eye is highest).

A simple form of luminance weighting used for depth blending is a linear interpolation of the luminance values observed by each pixel for the adjacent focal planes, which we will use as an example although other types of depth blending can also be used. Let $w_n$ and $w_f$ respectfully denote the luminance weights given to the near and far focal planes. These values, which sum to 1 to retain the correct luminance perceived by the eye, are computed as follows:

$$w_f = \frac{z_n - z}{z_n - z_f}, \quad (1)$$

$$w_n = 1 - w_f. \quad (2)$$

where $z_n$ and $z_f$ are the locations of the near and far focal planes and z is the actual location of the object in the 3D scene, which is between $z_n$ and $z_f$. In this linear formulation, if $z=z_n$ (object point at the near focal plane), then $w_f=0$ and $w_n=1$, meaning that all of the luminance is allocated to the near focal plane. Conversely, if $z=z_f$ (object at the far focal plane), then $w_f=1$ and $w_n=0$, and all of the luminance is allocated to the far focal plane. For an intermediate position such as $z=(z_n+z_f)/2$, then $w_f=\frac{1}{2}$ and $w_n=\frac{1}{2}$ so luminance is split between the far and near focal planes. In this way, a virtual object can be rendered at any position z between $z_n$ and $z_f$ by splitting its luminance between the two images rendered at focal planes $z_n$ and $z_f$.

Problem Formulation

We first formulate the problem of placement of focal planes based on a given objective function, and then show two examples of different objective functions. The objective function typically is a type of distortion metric that measures a distortion between an ideal rendering of the 3D scene versus the rendering by the MFD.

Let (x,y,z) denote the two transverse dimensions and the axial dimension of the 3D space rendered by the MFD. In practice, what we are typically given are the following quantities:

an N-voxel 3D scene to be projected $S=\{(p_n, I_n), n=1,\ldots, N\}$, where $p_n=(x_n,y_n,z_n)$ denotes a vector of 3D coordinates of a 3D point, and $I_n$ denotes the intensity or color value of that 3D point. These points can be obtained by a 3D camera or generated by a computer graphics engine, for example.

number of available depth planes M

Given these quantities, we want to estimate the following unknown variables:

position of focal planes $q=(q_1, q_2, \ldots, q_M)$. Note that the values $q_m$ are actually z-coordinates of focal planes and that the focal planes are fronto-parallel to the eye. We use q instead of z to clearly separate the focal plane positions from other z values.

To estimate the best positions of focal planes, we formulate the following optimization problem:

$$\text{find} \quad (3)$$
$$q^* = (q_1, q_2 \ldots, q_M)$$

$$\text{such that} \quad (4)$$
$$q^* = \underset{q}{\operatorname{argmin}} \, D(S, q),$$

where the objective function D(S, q) denotes a distortion error metric for representing a 3D scene S on M focal planes positioned at $q=(q_1, q_2, \ldots, q_M)$. This can in general be any metric that minimizes the error compared to a perfect rendering.

Alternately, we can pose the optimization problem such that it finds a solution for focal plane placement that maximizes the quality of the 3D scene rendering Q(S, q):

$$\text{find} \quad (5)$$
$$q^* = (q_1, q_2 \ldots, q_M)$$

$$\text{such that} \quad (6)$$
$$q^* = \underset{q}{\operatorname{argmax}} \, Q(S, q),$$

In the following, we show two specific examples of automatic focal plane placement. In the first example, we use an error metric D(S,q) and minimize it to obtain q. In the second example, we use a quality metric Q(S,q) that can be used for focal plane placement. Other distortion metric functions, including other error or quality metrics, can be used as well.

Solution Example 1: Focal Plane Placement Based on 3D Point Clustering

The first example of an objective function can be derived by considering the problem of focal plane placement as a clustering problem. Given the z-coordinates of all 3D data points in a scene. That is, given $z_1, z_2, \ldots, z_N$, we can use the K-means algorithm to find the best placement of M focal planes. In this case, our optimization problem becomes:

$$q^* = \arg\min_{q=(q_1,q_2,\ldots,q_M)} D_{KM}(S, q) \qquad (7)$$

$$= \arg\min_{q=(q_1,q_2,\ldots,q_M)} \frac{1}{MN} \sum_{n=1}^{N} \sum_{m=1}^{M} \|z_n - q_m\|_2^2$$

Solving this problem using the K-means algorithm gives a placement of focal planes such that the focal planes used to represent 3D data are close to the actual location of the data. Hence, in most cases this optimization problem will give a solution different from the conventional strategy of uniform focal plane spacing. Note that in the optimization above, instead of distance z in meters, we can also use distance in diopters (inverse meters) or other measures of optical power, in order to take into account for the decreasing sensitivity of depth perception with increasing distance.

Spatial frequencies of the content also impact accommodative response when depth blending is used. For low-frequency stimuli (for example, 4 cycle per degree or cpd), linear depth blending can drive accommodation relatively accurately between planes. But for high-frequency stimuli (for example, 21 cpd) and broadband stimuli (for example, 0-30 cpd), accommodation is almost always at or near a focal plane no matter how the luminance weights $w_f$, $w_n$ are distributed. Therefore, a weighted K-means algorithm can be used to take this spatial frequency dependency into account. For example, if the spatial frequency or spatial gradient value near a point is higher than a threshold, it can be assigned a large weight, otherwise it can be assigned a small weight. Denote $\overline{\omega}_n$ as the weight associated with each data point, Eq. 7 can be adapted to:

$$q^* = \arg\min_{q=(q_1,q_2,\ldots,q_M)} D_{KM}(S, q) \qquad (8)$$

$$= \arg\min_{q=(q_1,q_2,\ldots,q_M)} \frac{1}{MN} \sum_{n=1}^{N} \sum_{m=1}^{M} \overline{\omega}_n \|z_n - q_m\|_2^2$$

Figure 2:
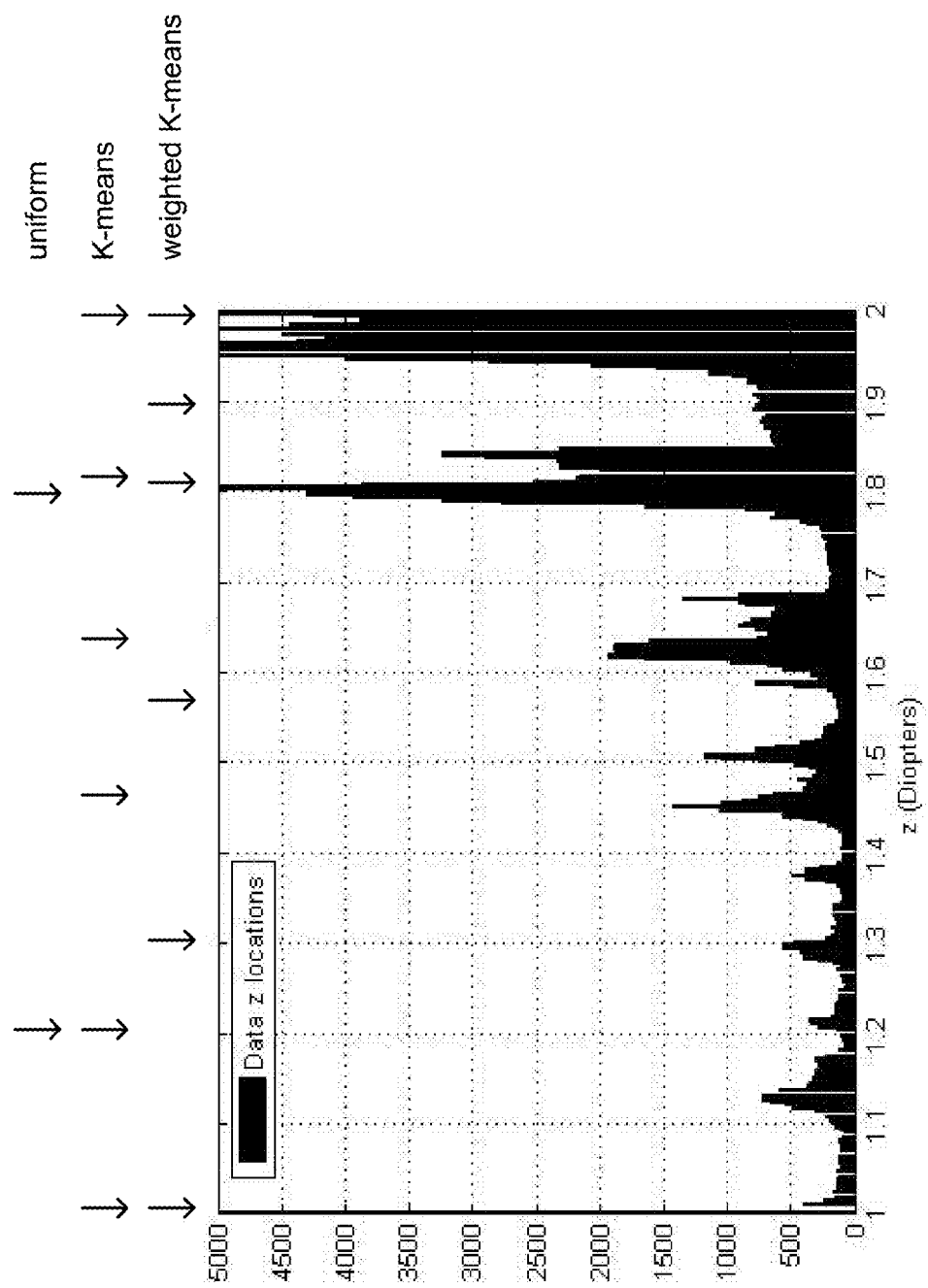
FIG. 2 is a histogram of z locations from a 3D scene, overlaid with focal plane locations for uniform focal plane spacing, K-means focal plane spacing and weighted K-means focal plane spacing.
Figure 3B:
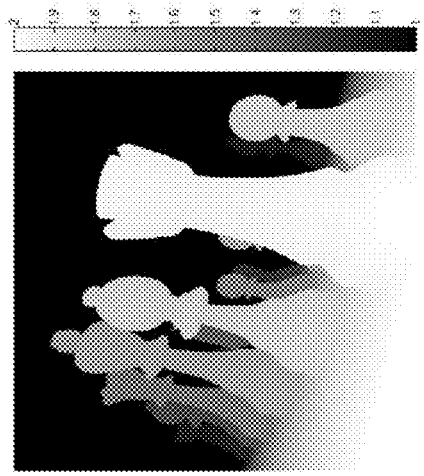
FIGS. 3a-3d are images showing the effect of different types of focal plane spacing.

FIG. 2 shows experimental results using the K-means and weighted K-means focal plane allocation algorithms described above. FIG. 2 shows a histogram of actual z locations from the 3D chess scene shown in FIG. 3a. FIG. 3b shows the same z locations as a grayscale image. In this particular example, the 3D scene has some but fewer points in the range (+1.0,+1.6)D, and then denser distribution of points in the range (+1.6,+2.0)D. The density in the latter range is because the scene contains a limited number of discrete chess pieces, each of which is located at a different depth.

Table 1 below shows the focal plane positions using uniform focal plane spacing, using K-means focal plane spacing and using weighted K-means focal plane spacing.

TABLE 1

Focal plane locations (in diopters)

| Uniform | K-means | Weighted K-means |
|---|---|---|
| +0.00 | +1.00 | +1.00 |
| +0.60 | +1.20 | +1.30 |
| +1.20 | +1.46 | +1.57 |
| +1.80 | +1.64 | +1.81 |
| +2.40 | +1.82 | +1.90 |
| +3.00 | +2.00 | +2.00 |

These focal plane locations are also shown by the arrows above the graph in FIG. 2. The uniform configuration was chosen according to the literature. It is evenly spaced from 0 D to +3.00 D to accommodate a variety of different scenes. However, this scene only spans +1.00 D to +2.00 D, so many of the focal planes are wasted. As can be seen, the content-adaptive algorithms allow focal planes to adapt to content depth distribution and concentrate focal planes where there is data. In comparison, uniform focal plane spacing is content-agnostic, which can result in more contrast loss.

Figure 3D:
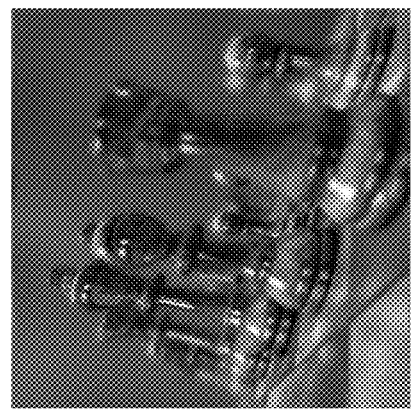
Figure 3A:
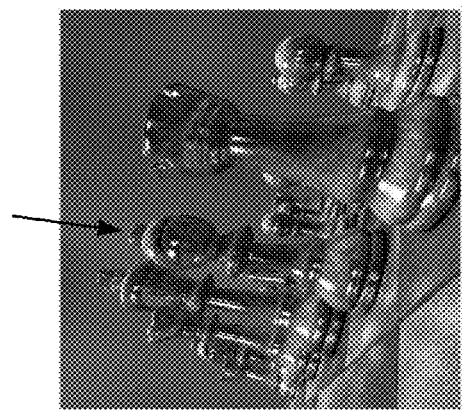
Figure 3C:
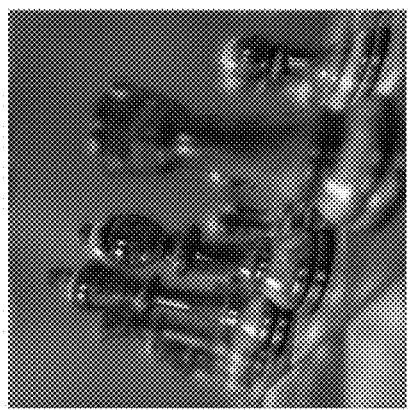

FIGS. 3a-3d are images showing the effect of different types of focal plane spacing. We use these images to compare uniform focal plane spacing and adaptive focal plane spacing. FIG. 3a shows the input 3D scene and FIG. 3b shows the depth map of the 3D scene in diopters. The bishop (indicated by the arrow in FIG. 3a) is the simulated accommodation target at approximately 1.63 D. FIG. 3c shows a simulated retinal image when the 3D scene is rendered by a six-plane MFD, where the focal planes are uniformly spaced as shown in Table 1 above. FIG. 3d shows a rendering, where the focal plane locations are determined using K-means clustering. Note that the rendered image in FIG. 3d appears more sharply focused than that of FIG. 3c because the bishop is closer to focal planes placed with the K-means algorithm than it is to those placed with uniform spacing.

K-means is used just as an example. Other clustering techniques can be applied, for example clustering based on Gaussian Mixture Models (GMM) or support vector machines (SVM).

Solution Example 2: Focal Plane Placement Based on Defocus Metric

When a given 3D scene with continuous depth values is displayed on a multi-focal display with a finite number of focal planes, human eyes will perceive it with a certain amount of defocus compared to an ideal continuous 3D rendering. We describe here a model of that defocus, which we then use within our objective function for focal plane placement. Namely, our objective function will place the focal planes such that it maximizes the quality of the 3D scene rendering by minimizing the defocus.

Optical defocus is typically modeled through Fourier optics theory, in a continuous waveform domain. Therefore, assume that a given 3D scene is a set of samples from a continuous 3D function $f(x,y,z)$, where we have that $I_n = f(x_n, y_n, z_n)$ for $n = 1, 2, \ldots, N$ given points in our 3D scene. We first provide a Fourier derivation of a human eye's sensitivity to defocus and then use the derived theory to define a quality metric for a given 3D scene.

Let primed coordinates (x', y') denote the retinal coordinates. When the eye accommodates to a distance $z_e$, a 2D retinal image g(x', y') may be expressed as a convolution of the 3D object with the 3D blur kernel h(x, y, z) evaluated at a distance $z_e - z$, followed by integration along the axial dimension:

$$g(x',y',z_e) = \iiint f(x,y,z) h(x-x', y-y', z_e - z) dx\, dy\, dz. \qquad (9)$$

Note that in the case of in-focus plane-to-plane imaging ($z_e - z = 0$), the convolution kernel h reduces to the eye's impulse response. This configuration yields maximum contrast, where contrast is defined in the conventional way in the spatial frequency domain. Deviations from that in-focus imaging result in a reduction in contrast. The severity of the lost contrast depends on the amount of defocus.

To quantify the effects of defocus, we turn to the pupil function of the eye's optical system. For a rotationally-symmetric optical system with focal length F and circular pupil of diameter A, the lens transmittance through the exit pupil is modeled as:

$$t(x, y) = \exp\frac{-i\pi(x^2 + y^2)}{\lambda F}P(x, y), \quad (10)$$

where the pupil function P is given by $$P(x, y) = circ\left(\frac{x}{A}, \frac{y}{A}\right). \quad (11)$$

In our system, the pupil diameter A may vary between ~2-8 mm based on lighting conditions. Though the eye is, in general, not rotationally symmetric, we approximate it as such to simplify formulation in this example.

In the presence of aberrations, the wavefront passing through the pupil is conventionally represented by the generalized pupil function $G(x, y)=P(x, y)\exp(i\varphi(x, y))$, where the aberration function $\varphi$ is a polynomial according to Seidel or Zernike aberration theory. The defocus aberration is commonly measured by the coefficient $w_{20}$ of $\varphi$. Defocus distortion can alternatively be modeled by including a distortion term $\theta_z$ in the pupil function and defining the pupil function of a system defocused by distance $\theta_z$ in axial dimension as $$P_{\theta_z}(x,y)=\exp(\pi i(\theta_z/\lambda)(x^2+y^2))P(x,y), \quad (11)$$

where $\theta_z = 1/z + 1/z_r - 1/F$ with $z_r$ being the distance between the pupil and the retina. The relationship between $\theta_z$ and the conventional defocus aberration coefficient $w_{20}$ is given by $\theta_z = 2w_{20}/A^2$. Using this formulation, we can formulate the defocus transfer function, which is the optical transfer function of the defocused system, as the auto-correlation of the pupil function of the defocused system as follows:

$$\hat{h}_{\theta_z}(u, v) = \iint P^*_{\theta_z}\left(x - \frac{\lambda d_r u}{2}, y - \frac{\lambda d_r v}{2}\right)P_{\theta_z}\left(x + \frac{\lambda d_r u}{2}, y + \frac{\lambda d_r v}{2}\right)dxdy \quad (12)$$

Now we replace the defocus distortion distance $\theta_z$ with $1/z_e - 1/z$ and define the normalized defocus transfer function (DTF) of the eye as $$\hat{H}(u, v, z, z_e) = \frac{\hat{h}_{1/z_e - 1/z}(u, v)}{\hat{h}_0(0, 0)}. \quad (13)$$

Optical aberrations of the eye and/or the MFD system can be modeled into the DTF as well.

The image as formed on the retina is described by the multiplication of the defocus transfer function and the Fourier transform of the function $f(u,v,z)$ describing the object displayed at distance z from the eye by $$\hat{g}(u,v,z,z_e) = \hat{H}(u,v,z,z_e)\hat{f}(u,v,z). \quad (14)$$

In a MFD system, we can typically display only a small number of focal planes fast enough to be perceived as simultaneously displayed by the human eye. For the case that two objects are being displayed at two focal planes located at distances $q_1$ and $q_2$ away from the eye, the eye integrates the two objects as imaged through the eye's optical system. That is, it integrates over the light emitting from the two objects after passing through the eye's optical system described by the defocus transfer function. We derive this image formation at the retina plane by the following formula $$\hat{g}_r(u,v,q_1,q_2,z_e) = \hat{H}(u,v,q_1,z_e)\hat{f}(u,v,z) + \hat{H}(u,v,q_2,z_e)\hat{f}(u,v,z). \quad (15)$$

If linear depth blending is applied to the input scene $f(x,y,z)$, using coefficients $w_1$ and $w_2$, then the Fourier transform of perceived image on the retina is described by $$\hat{g}_r(u,v,q_1,q_2,z_e) = w_1\hat{H}(u,v,q_1,z_e)\hat{f}(u,v,z) + w_2\hat{H}(u,v,q_2,z_e)\hat{f}(u,v,z). \quad (16)$$

Using this observation, we define the depth-blended defocus transfer function of the entire system as $$\hat{H}_{blend}(u,v,(q_1,q_2),z_e) = w_1\hat{H}(u,v,q_1,z_e) + w_2\hat{H}(u,v,q_2,z_e), \quad (17)$$

Figure 4:
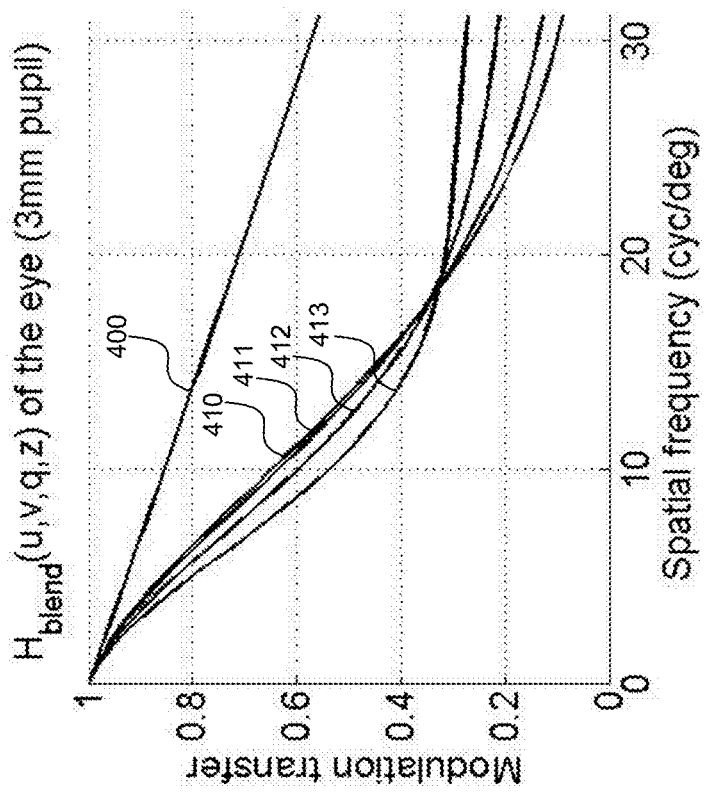
FIG. 4 is a plot of a depth-blended defocus transfer function.

FIG. 4 shows this function for various levels of defocus $\{-0.3, -0.2, \ldots, +0.3\}$D. FIG. 4 plots the depth-blended defocus transfer function of a 3 mm pupil observing a stimulus located at 1.5 D as rendered by two focal planes located at 1.2 and 1.8 D. Curve 400 is the ideal MTF. Curve 410 is the DTF for a defocus of 0D, curve 411 is the DTF for a defocus of +0.1 D or −0.1 D, curve 412 is for defocus of +/−0.2 D, and curve 413 is for defocus of +/−0.3 D. Note there is a spatial frequency (in this case approximately 18 cpd) at which the different DTF curves intersect. Spatial frequencies lower than this transitional frequency generate the correct focus cues. Above this frequency, the depth-blended defocus transfer function curve for 0 D of defocus is lower than that of +/−0.3 D of defocus. For stimuli within this frequency range, the eye is forced to accommodate at one of the adjacent focal planes rather than the target stimulus location, resulting in an incorrect focus cue.

We can also generalize this blending function using all display planes $q_1, \ldots, q_M$ to derive an effective or blended transfer function for the multi-focal display as:

$$\hat{H}_{blend}(u, v, q, z_e) = \sum_{m=1}^{M} w_m \hat{H}(u, v, q_m, z_e). \quad (18)$$

for $$q = (q_1, \ldots, q_M).$$

Depth blending drives the accommodation of the eye to a focal plane with a $\hat{H}_{blend}(u, v, q, z_e)$ closest to the ideal DTF curve. We can see from FIG. 4 that this accommodation plane distance depends greatly on spatial frequency. Therefore, we use the theory developed above to derive a content-aware metric to quantify the impacts that focal plane placement and depth fusion have on effective resolution loss.

The eye will accommodate to a distance that maximizes the area under the DTF. However, since that distance depends on the spatial frequency, we further assume that the eye will accommodate to the distance that maximizes a certain quality metric $Q_{DM}(S,q)$ based on this defocus measure (area under the DTF). Since this distance varies with each patch, we seek a solution that incorporates all of the patches into a single metric.

In one approach, we partition the displayed image $f(x,y,z)$ into $N_p$ patches $f_i(x,y,z_i)$, $i=1, \ldots, N_p$, where $z_i$ is a scalar representing the $i^{th}$ patch's mean object distance. Overlapping patches may be used. We may compute each patch's Fourier transform and multiply it with the depth-fused DTF to find the information transferred from a stimulus to the eye according to a placement of focal planes located at $q=\{q_1, q_2, \ldots, q_M\}$ and a local stimulus located at distance $z_o$ to compute the scalar value $\beta_i$ for each patch:

$$\beta_i(z_i,q) = \int_{u_0}^{u_1} \int_{v_0}^{v_1} \hat{f}_i(u,v,z_i) \hat{H}_{blend}(u,v,q,z_o) du dv. \quad (19)$$

where $[u_0, u_1]$ and $[v_0, v_1]$ denote the frequency interval of interest. Other metrics describing the object's information content, such as measures of contrast, entropy, or other transformative metrics could be used to define $\beta_i(z_i, q)$ as well.

If we store the metrics from all of the patches into a vector $\beta$ we can alter the focal plane placement for up to M focal planes. We seek to solve the following optimization problem to find $q^*$, the optimal set of dioptric distances to place the available focal planes:

$$q^* = \underset{q}{\operatorname{argmax}} Q_{DM}(S, q) = \underset{q}{\operatorname{argmax}} \sum_{i=1}^{N_p} \beta(z_i, q)^2 \quad (20)$$

which can be relaxed or adjusted if not solvable in realistic time.

The resulting entries of $q^*$ signify where best to place the set of M focal planes. For example, optimizing 2 focal planes to represent 3 objects clustered about dioptric distances of $1/z_1=0.6$ D, $1/z_2=1.5$ D; $1/z_3=2.0$ D might result in the optimal focal plane placement of $1/q_1=1.1$ D, $1/q_2=1.8$ D.

The solution for q could begin with an initial guess of uniform focal plane spacing based on the available focal planes. For example, a 6-plane system seeking a workspace between 0 and 3 diopters could start with $\{0, 0.6, 1.2, 1.8, 2.4, 3.0\}$D. As the optimization algorithm iterates through iterations k, the entries of q would change until $|Q_{DM}^k(S, q) - Q_{DM}^{k+1}(S,q)| \leq \epsilon$, where $\epsilon$ is a tolerance parameter telling the algorithm when to stop. Extra specifications could be incorporated into the optimization algorithm to constrain the feasible solution set, as well.

Finally, note that the metric $Q_{DM}(S, q)$ quantifies the quality of the rendering of a given 3D scene, with respect to defocus. Therefore, in addition to focal plane placement, this metric can be also used for rendering quality assessment in MFDs.

FIGS. 5-6 show simulation results for the approach described above. This experiment validates the behavior of the metric $\beta$ of Eq. 19. During the experiment, two focal planes were set at distances $1/q_1=1.2$ D, $1/q_2=1.8$ D. The stimulus, a set of cosine waves incrementing in spatial frequency by 1 cpd, was simulated at a virtual distance $1/z_o=1.5$ D away from the observer, or right between the two focal planes.

Figure 5B:
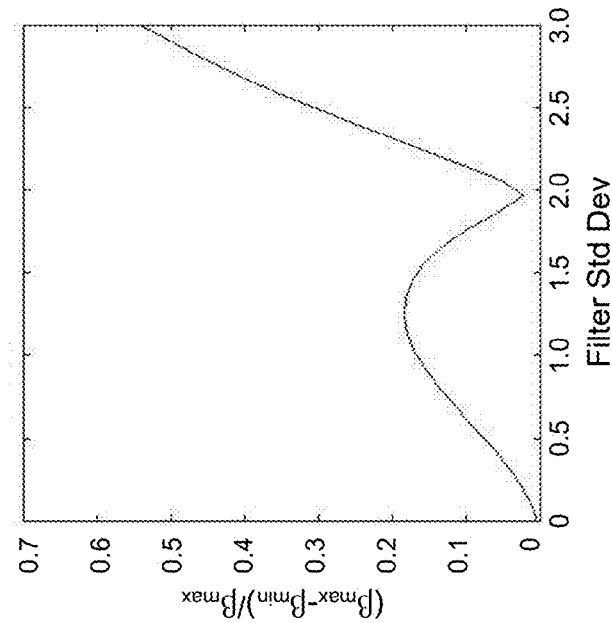
FIG. 5b plots $(\beta_{max}-\beta_{min})/\beta_{max}$ against spatial frequency.
Figure 5A:
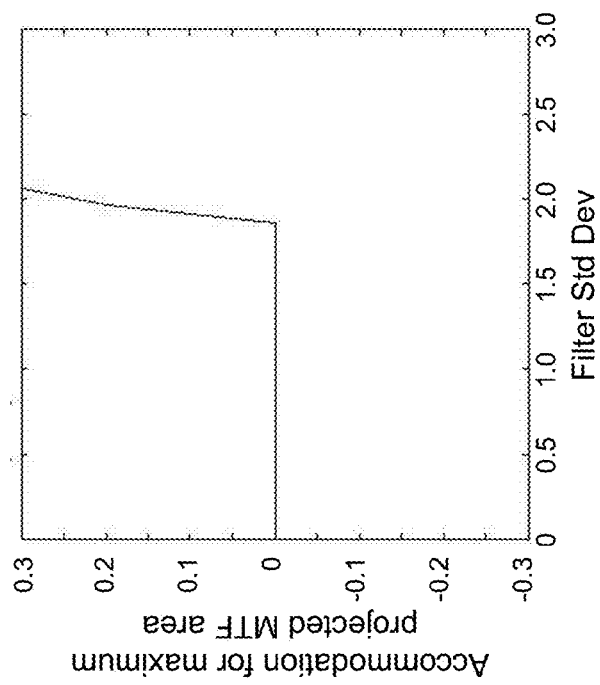
FIG. 5a plots the accommodation state that maximizes the metric $\beta$ against input spatial frequency.

The eye's accommodation was varied in increments of 0.1 D between these two focal planes. The accommodation is between $-0.3$ and $+0.3$ D, where $+0$ D corresponds to the dioptric midpoint of the focal planes at $q_1$ and $q_2$. FIG. 5a plots the accommodation state that maximizes the metric $\beta$ against input spatial frequency. FIG. 5b plots $(\beta_{max}-\beta_{min})/\beta_{max}$ against spatial frequency, which should minimize at $u=0$ and $u=18$ cycles per degree as shown in the depth-blended defocus transfer function plots of FIG. 4. Other metrics can be used. These plots show that the metric will be highest at the dioptric midpoint of the two focal planes for lower and middle spatial frequencies. When the local stimulus spectrum is above the transition frequency, the metric will maximize at one of the focal planes.

FIGS. 6a-6c show the simulated eye responses for stimulus with different spatial frequencies rendered between planes using depth blending. FIG. 6a shows 7 squares which are images of a 9 cpd image. For each square in the figure, the eye accommodates to the state shown in Table 2.

TABLE 2

| Eye accommodations | | |
| --- | --- | --- |
| $-0.3$ D | $-0.2$ D | $-0.1$ D |
| 0 D | $+0.1$ D | $+0.2$ D |
| $+0.3$ D | Not used | Not used |

That is, the top left square is an image of a 9 cpd image where the eye accommodates to $-0.3$ D. For the top middle square, the eye accommodates to $-0.2$ D, and so on. The bottom middle and bottom right squares are not used, so they are left blank. FIGS. 6b and 6c show the same arrangement of eye accommodations, but for a 18 cpd and 25 cpd image, respectively.

Although the detailed description contains many specifics, these should not be construed as limiting the scope of the invention but merely as illustrating different examples and aspects of the invention. It should be appreciated that the scope of the invention includes other embodiments not discussed in detail above. For example, FIG. 1 shows a multi-focal display with a finite number of planar focal planes that are all located to one side of the display, as reproduced in FIG. 7a. In FIG. 7a, the dashed box 700 represents the 3D focal volume to be rendered and, in this example, it is rendered by images located at the focal planes represented by the solid lines 710. In alternate embodiments, the focal planes could be distributed to both sides of the display and they could be non-planar. For example, as shown in FIG. 7b, there could be a number of focal surfaces 712, which are curved or have other non-planar shapes. In addition, in FIG. 7c, the focal surfaces 714 have different shapes. FIG. 7d shows an example where the multi-focal display can render points at more than a finite number of surfaces. In this example, 716 is a slice that has volume and the multi-focal display can render points within that volume. This is true for each of the volumes shown. However, the volumes in the aggregate do not allow address of every point within the focal volume 700. That is, points that are located outside the slices will be represented by depth blending between different slices. For convenience, the term "renderable volume" will be used to refer to both 2D surfaces as shown in FIGS. 7a-c and 3D volumes as shown in FIG. 7d.

In another aspect, in addition to selecting the locations of the renderable volumes, the multi-focal display also selects the number of renderable volumes. In the original example with six focal planes, the multi-focal display might determine the number M of focal planes where M can be up to six. Less than the maximum number may be selected for various reasons, for example to reduce power consumption.

In yet another aspect, FIG. 1 shows a multi-focal display for one eye. Two-eye and stereo systems can also be used. In addition, additional optics, such as beamsplitters, may be used to combine the scene rendered by the multi-focal display with other scenes or the surrounding environment.

Various other modifications, changes and variations which will be apparent to those skilled in the art may be made in the arrangement, operation and details of the method and apparatus of the present invention disclosed herein without departing from the spirit and scope of the invention as defined in the appended claims. Therefore, the scope of the invention should be determined by the appended claims and their legal equivalents.

In alternate embodiments, aspects of the invention are implemented in computer hardware, firmware, software, and/or combinations thereof. Apparatus of the invention can be implemented in a computer program product tangibly embodied in a non-transitory machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits) and other forms of hardware.

The term "module" is not meant to be limited to a specific physical form. Depending on the specific application, modules can be implemented as hardware, firmware, software, and/or combinations of these. Furthermore, different modules can share common components or even be implemented by the same components. There may or may not be a clear boundary between different modules.

What is claimed is:

1. A computer-implemented method for selecting locations of focal planes for a multi-focal display in order for the multi-focal display to render actual content from a three-dimensional scene, the method comprising:
    analyzing the actual content from the three-dimensional scene to be rendered by the multi-focal display;
    selecting the locations of the focal planes based on the analysis of the actual content, wherein selecting the locations of the focal planes comprises selecting the locations based on K-means clustering of the locations of points in the three-dimensional scene;
    configuring the multi-focal display according to the selected locations of the focal planes; and
    rendering the actual content on the multi-focal display in said configuration.

2. The method of claim 1
    wherein the selected locations are non-uniformly spaced over an operating range of the multi-focal display.

3. The method of claim 1 wherein analyzing the actual content and selecting the locations of the focal planes occurs in real-time.

4. The method of claim 1 wherein the multi-focal display renders scenes using not more than six focal planes.

5. The method of claim 1 wherein analyzing the actual content comprises analyzing the actual content from the three-dimensional scene in a spatial domain, and selecting the locations of the focal planes comprises selecting the locations of the focal planes based on the analysis in the spatial domain.

6. The method of claim 1 wherein analyzing the actual content comprises analyzing the actual content from the three-dimensional scene in a spatial frequency domain, and selecting the locations of the focal planes comprises selecting the locations of the focal planes based on the analysis in the spatial frequency domain.

7. The method of claim 1 wherein selecting the locations of the focal planes is further based on rendering requirements of the multi-focal display.

8. The method of claim 1 further comprising selecting a number M of focal planes based on the analysis of the actual content.

9. The method of claim 1 wherein the multi-focal display is a near-eye multi-focal display.

10. A multi-focal display for rendering actual content from a three-dimensional scene by using a plurality of focal planes at different locations, the locations of the focal planes determined based on analysis of the actual content of the three-dimensional scene to be rendered, wherein selecting the locations of the focal planes comprises selecting the locations based on K-means clustering of the locations of points in the three-dimensional scene, the multi-focal display configurable according to the selected locations of the focal planes and rendering the actual content in said configuration.

11. The multi-focal display of claim 10 wherein the selected locations are non-uniformly spaced over an operating range of the multi-focal display.

12. The multi-focal display of claim 10 wherein analyzing the actual content and selecting the locations of the focal planes occurs in real-time.

13. The multi-focal display of claim 10 wherein the multi-focal display renders scenes using not more than six focal planes.

14. The multi-focal display of claim 10 wherein analyzing the actual content comprises analyzing the actual content from the three-dimensional scene in a spatial domain, and selecting the locations of the focal planes comprises selecting the locations of the focal planes based on the analysis in the spatial domain.

15. The multi-focal display of claim 10 wherein analyzing the actual content comprises analyzing the actual content from the three-dimensional scene in a spatial frequency domain, and selecting the locations of the focal planes comprises selecting the locations of the focal planes based on the analysis in the spatial frequency domain.

16. The multi-focal display of claim 10 wherein selecting the locations of the focal planes is further based on rendering requirements of the multi-focal display.

17. The multi-focal display of claim 10 wherein the multi-focal display is a near-eye multi-focal display.

18. A computer program product for use with a computer, the computer program product comprising a non-transitory computer readable medium having a computer program code embodied therein for selecting locations of focal planes for a multi-focal display in order for the multi-focal display to render actual content from a three-dimensional scene, the computer program code performing the steps of:

analyzing the actual content from the three-dimensional scene to be rendered by the multi-focal display;

selecting the locations of the focal planes based on the analysis of the actual content, wherein selecting the locations of the focal planes comprises selecting the locations based on K-means clustering of the locations of points in the three-dimensional scene;

configuring the multi-focal display according to the selected locations of the focal planes; and rendering the actual content on the multi-focal display in said configuration.

19. The computer program product of claim 18 wherein the selected locations are non-uniformly spaced over an operating range of the multi-focal display.

20. The computer program product of claim 18 wherein analyzing the actual content and selecting the locations of the focal planes occurs in real-time.

* * * * *